(12) United States Patent
Schlaeffer

(10) Patent No.: US 12,010,215 B2
(45) Date of Patent: Jun. 11, 2024

(54) CALCULATING HASH VALUES

(71) Applicant: Infineon Technologies AG, Neubiberg (DE)

(72) Inventor: Martin Schlaeffer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 291 days.

(21) Appl. No.: 17/674,015

(22) Filed: Feb. 17, 2022

(65) Prior Publication Data

US 2022/0278824 A1 Sep. 1, 2022

(30) Foreign Application Priority Data

Mar. 1, 2021 (DE) .................. 102021104867.2

(51) Int. Cl.
| | |
|---|---|
| *H04L 9/06* | (2006.01) |
| *G06F 12/1018* | (2016.01) |
| *G06F 12/14* | (2006.01) |
| *H04L 9/32* | (2006.01) |

(52) U.S. Cl.
CPC ........ *H04L 9/0643* (2013.01); *G06F 12/1018* (2013.01); *G06F 12/1408* (2013.01); *H04L 9/3239* (2013.01)

(58) Field of Classification Search
CPC ............. H04L 9/0643; H04L 9/3239; H04L 2209/122; G06F 12/1018; G06F 12/1408; G06F 12/0207
See application file for complete search history.

(56) References Cited

U.S. PATENT DOCUMENTS

| | | | | |
|---|---|---|---|---|
| 6,976,168 | B1* | 12/2005 | Branstad | H04L 63/12 |
| | | | | 713/176 |
| 2015/0278334 | A1* | 10/2015 | Gerweck | G06F 16/283 |
| | | | | 707/706 |
| 2015/0278598 | A1* | 10/2015 | Scott | H04L 9/3239 |
| | | | | 382/100 |
| 2016/0366109 | A1* | 12/2016 | Lablans | G06Q 20/34 |
| 2022/0138349 | A1* | 5/2022 | Saarinen | H04L 9/50 |
| | | | | 713/192 |
| 2024/0007269 | A1* | 1/2024 | Zheng | H04L 9/0643 |

OTHER PUBLICATIONS

Al-Odat, Zeyad A., "Secure Hash Algorithms and the Corresponding FPGA Optimization Techniques", ACM Computing Surveys (CSUR), vol. 53, Nr. 55; DOI:10.1145/3311724, Sep. 2020, pp. 1-36.
May, Willie, "Federal Information Processing Standards Publication", FIPS PUB 202, SHA-3 Standard: Permutation-Based Hash and Extendable-Output Functions, Aug. 2015, pp. 1-37.
Nannipieri, Pietro, et al., "SHA2 and SHA-3 Accelerator Design in a 7nm Technology Within the European Processor Initiative", Journal of Microprocessors and Microsystems, Sep. 2020, pp. 1-12.
Unknown, Author, "SHA-3 Standard: Permutation- Based Hash and Extendable-Output Functions", FIPS PUB 202; Information Technology Laboratory National Institute of Standards and Technology, Aug. 2015, 1-37.

* cited by examiner

*Primary Examiner* — Michael Won
(74) *Attorney, Agent, or Firm* — Murphy, Bilak & Homiller, PLLC

(57) ABSTRACT

Determining hash values based on at least two types of hash functions, utilizing a memory that is arranged to store at least one state to be used to determine hash values pursuant to a SHA-3 function, wherein hash values pursuant to any of a SHA-2 function or a SHA-1 function are determined based on the state.

9 Claims, 3 Drawing Sheets

301 Determine hash value based on different types of hash functions

302 Utilize state as virtual data structure to compile at least one hash value for the selected type of hash function

CALCULATING HASH VALUES

TECHNICAL FIELD

The present disclosure is related to devices for producing cryptographic hash values.

BACKGROUND

Currently, three types of cryptographic hash functions are standardized by NIST and commonly used, namely SHA-1, SHA-2 and SHA-3:

SHA-1: A 160-bit hash function which resembles the earlier MD5 algorithm. This was designed by the National Security Agency (NSA) to be part of the Digital Signature Algorithm. Cryptographic weaknesses were discovered in SHA-1, and the standard was no longer approved for most cryptographic uses after 2010.

SHA-2: A family of two similar hash functions, with different block sizes, known as SHA-256 and SHA-512. They differ in the word size; SHA-256 uses 32-byte words where SHA-512 uses 64-byte words. There are also truncated versions of each standard, known as SHA-224, SHA-384. SHA-512/224 and SHA-512/256. These were also designed by the NSA.

SHA-3: A hash function formerly called Keccak, chosen in 2012 after a public competition among non-NSA designers. It supports the same hash lengths as SHA-2, and its internal structure differs significantly from the rest of the SHA family.

It is noted that each hash function SHA-1. SHA-2 or SHA-3 is herein also referred to as a type of hash function. Each type of hash function may have several different implementations and/or—in case of SHA-2—families of hash functions.

SHA-1 and SHA-2 use the Mergle-Damgard construction and are ARX (add, rotate, xor)-based designs. SHA-3 uses the Sponge construction and is an SPN (substitution permutation network)-based design.

Additionally, all hash functions have derivates with different message, hash, state, chaining value and word sizes, which results in different interfaces, memories, and data paths for each of the hash function.

For example, word sizes of 32-bit or 64-bit and different intermediate state sizes amounting to, e.g., 160-bit for SHA-1 or 1600 bits for SHA-3, are used.

SUMMARY

Due to variations in design, separate hardware realizations (also referred to as hardware accelerators) are implemented for each of the several types of hash function. This applies in particular for SHA-3, which utilizes a design that is substantially different from SHA-1 or SHA-2.

It is a disadvantage that any hardware that is capable of providing hash values according to different types of hash functions, e.g., SHA-1, SHA-2 or SHA-3, require a large amount of space in hardware, in particular on a chip.

Hence, based on the general objective for efficient area utilization, it is an objective to enable an optimized hardware structure that is capable of performing several hash functions, in particular at least two different types of hash functions.

This is solved according to the features of the independent claims. Further embodiments result from the dependent claims.

The examples suggested herein may be based on at least one of the following solutions.

Combinations of the following features could be utilized in order to reach a desired result. The features of the method could be combined with any feature(s) of the device, apparatus, or system, or vice versa.

A device is provided for determining hash values based on at least two types of hash functions, wherein the device
  comprises a memory that is arranged to store at least one state to be used to determine hash values pursuant to a SHA-3 function, and
  is arranged to determine hash values pursuant to any of a SHA-2 function or a SHA-1 function based on the state.

The SHA-2 function may be a SHA-256 function or a SHA-512 function.

According to an embodiment, each of the states comprises bits that are arranged in a virtual data cube, wherein the virtual data cube comprises:
  a number of z slices,
  a number of y planes, and
  a number of x sheets.

The state may be a data structure that is stored in the memory. The organization of the state allows for an efficient determination of hash values for different types of hash functions. The state may thus serve as a shared memory to be used differently for each type of hash function.

It is noted that
  each plane comprises a number of z rows and a number of x lanes;
  each slice comprises a number of x columns and a number of y rows; and
  each sheet comprises a number of y columns and a number of z lanes.

According to an embodiment, an input message of the SHA-2 function and chaining values of the SHA-2 function are stored in lanes of the state.

According to an embodiment, an addition of the SHA-2 function is computed in a slice-by-slice manner on the slices of the state.

According to an embodiment, bitwise Boolean functions majority and choice of the SHA-2 function are each computed in a slice-by-slice manner on the slices of the state.

According to an embodiment, sigma functions of SHA-2 function computed in a lane-by-lane manner on lanes of the state.

According to an embodiment, the state is part of a shared hardware, which further comprises a shared interface, shared data paths and/or a shared logic to determine the hash values.

According to an embodiment, the device is at least one of the following or it is at least part of one of the following or it comprises at least one of the following:
  an integrated circuit,
  a hardware security module,
  a trusted platform module.
  a crypto unit,
  a FPGA.
  a processing unit.
  a controller,
  a smartcard.

Also, a method is suggested for determining hash values based on at least two types of hash functions,
  wherein a shared memory comprises at least one state, wherein the structure of the state is capable of determining hash values pursuant to the SHA-3 function, wherein hash values pursuant to any of a SHA-2 function or a SHA-1 function are determined based on the structure of the state.

Further, a computer program product is provided, which is directly loadable into a memory of a digital processing device, comprising software code portions for performing the steps of the method as described herein.

BRIEF DESCRIPTION OF THE FIGURES

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Figure 1:
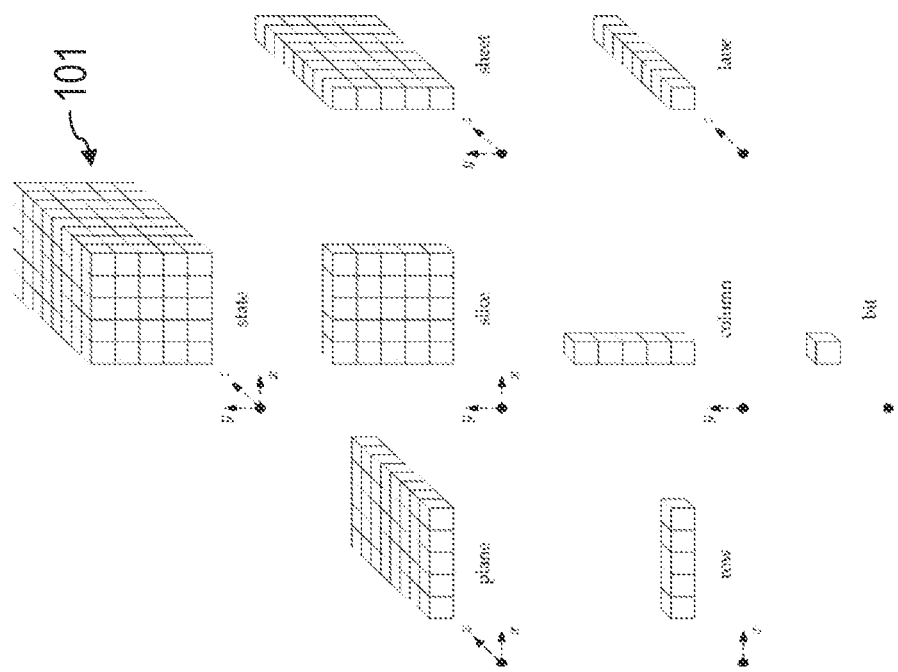
FIG. 1 shows a virtual data structure, also referred to as state as it is exemplarily used to calculate hash values of the SHA-3 function.

Examples described herein in particular refer to a shared hardware that may be used for compiling different types of hash functions, in particular at least two out of SHA-1, SHA-2, and SHA-3. The hardware may be shared on several levels, e.g., a shared interface, a shared memory, shared data paths and/or a shared logic. The solutions presented allow significantly reducing the hardware overhead by a hardware solution that implements, e.g., the SHA-3 function in combination with the SHA-1 function and/or the SHA-2 function.

The shared interface of the shared hardware comprises a memory-based interface using, e.g., 32-bit words or 64-bit words.

An example may be as follows: The SHA-1 part of the shared interface comprises sixteen (16) 32-bit message words and five (5) 32-bit hash or chaining value words. The SHA-256 part of the shared interface comprises sixteen (16) 32-bit message words and eight (8) 32-bit hash or chaining value words, whereas the SHA-512 part of the shared interfaces comprises sixteen (16) 64-bit message words and eight (8) 64-bit hash or chaining value words. The SHA-3 part of the shared interface comprises twenty-five (25) 64-bit words containing the whole SHA-3 state consisting of nine (9) to twenty-one (21) 64-bit message words depending on respective hash function.

The shared interface is mapped to enable an efficient data transfer between a central processing unit (CPU) and the shared hardware. The shared memory of the shared hardware may contain software for at least a portion of each type of hash function. In addition, each data word can be accessed in a random or pseudo-random order, which can be useful for security applications.

Although each type of hash function utilizes a different state size and memory structure (different state, message, hash, chaining value, word sizes), the approach provided herein suggests using a shared memory for all types of hash functions to reduce the overall area required on the hardware (i.e., on at least one chip).

To further optimize the shared hardware, a shared datapath and shared logic may be used. The shared datapath may be used for all three types of hash functions. The various types of hash functions use word-wise functions, which may be different for each type of hash function. The functions may contain rotations, shifts, 32-bit and 64-bit word operations and rotate-with-XOR functions (sigma functions of SHA-2). Also, modular additions are required for SHA-1 and SHA-2 and Rho, Iota, Theta, Pi and Chi (Sbox) functions for SHA-3. Within the shared datapath, shared logic is used which breaks these different functions into common pieces, which are then combined by the hardware again to compute all necessary functions for SHA-1, SHA-2, and SHA-3.

FIG. 1 shows an exemplary structure of a state 100 that may be used for each type of hash function. The state 100 is visualized as a three-dimensional data structure comprising three axes x, y, and z. The single element of the state is a bit, and the z-dimension indicates the length of the word, which may be, e.g., a 32-bit word or a 64-bit word.

In the example of FIG. 1, an exemplary number of eight (8) bits are shown in z-direction, whereas an actual implementation may utilize words with thirty-two (32) bits or sixty-four (64) bits.

In the example shown in FIG. 1, the state 100 comprises 5·5·8=200 bits. As is also shown in FIG. 1, the state 100 comprises
- 5 planes,
- 8 slices,
- 5 sheets,
- 40 rows, and
- 40 columns.

The state 100 is an exemplary data structure that may be stored to a memory in various ways. For example, the three-dimensional state 100 can be stored in a linear memory. For example, a memory management system or any software accessing the linear memory may ensure that a virtual three-dimensional data structure can be accessed, e.g., via coordinates or indices.

The state 100 may be used for each type of hash function as follows:

Data can be stored in various portions of the state 100, which is a data structure with a predefined number of bits in z-direction. Hence, when reference is made to a "word" that is stored in a lane this refers to a lane of the state 100. The state 100 has as many bits in z-direction as there are bits in the word. An exemplary word may have thirty-two (32) bits or sixty-four (64) bits, but other implementations are feasible as well.

The state 100 corresponds to a memory that is utilized for SHA-3. The solution presented herein allows using this state 100 also for SHA-2 or SHA-1.

SHA-3 determines
- 24 rounds with index i=0, 1, . . . , 23;
- 64-bit lanes with bit index j=0, 1, . . . , 63.

According to an exemplary embodiment, a variant of SHA-3 may use fifty (50) 32-bit lanes with bit index j=0, 1, . . . , 31.

SHA-3 further comprises the functions Theta, Pi, Rho, Chi, Iota (see, e.g., https://en.wikipedia.org/wiki/SHA-3). The functions Theta, Pi, Chi, Iota are usually computed slice-by-slice in hardware. The function Rho is usually computed lane-by-lane in hardware.

SHA-2 comprises SHA-256 (128-bit security) and SHA-512 (256-bit security). In case of SHA-256, the following is determined/used:
- 64 rounds with index i=0, 1, . . . , 63; and
- 32-bit words with bit index j=0, 1, . . . , 31.

In case of SHA-512, the following is determined/used:
- 80 rounds with index i=0, 1, . . . , 79; and
- 64-bit words with bit index j=0, 1, . . . , 63.

In an exemplary implementation, SHA-512 may further use
- An input message: w[0] . . . w[15], which corresponds to 16 words that are stored in 16 lanes of the state 100.
- Chaining values: a, b, c, d, e, f, g, h, which are 8 words that are stored in 8 lanes of the state 100.

The input message (16 words) and the chaining values (8 words) are stored as twenty-four (24) words in twenty-four (24) lanes out of the twenty-five (25) lanes of the state 100.

Further, SHA-2 consists of additions, bitwise Boolean functions (maj, ch) and sigma functions (s0, s1, S0, S1):
- The addition is computed slice-by-slice (starting from bit 0 because of the carry bit or since addition is a T-function).
- The bitwise Boolean functions majority (maj) and choice (ch) are computed slice-by-slice.
- The sigma functions s0, s1, S0, S1 are computed lane-by-lane.

Hereinafter, "temp1" and "temp2" are temporary values. "and", "xor", "not" are Boolean functions. "rightrotate k" is a rotate instruction to the right by k bits and "rightshift k" is a shift instruction to the right by k bits.

The sigma functions to be computed on lanes (words) are as follows:
s0 (w[i−15] rightrotate 7) xor
(w[i−15] rightrotate 18) xor
(w[i−15] rightshift 3)
s1:=(w[i−2] rightrotate 17) xor
(w[i−2] rightrotate 19) xor
(w[i−2] rightshift 10)
S0:=(a rightrotate 2) xor
(a rightrotate 13) xor
(a rightrotate 22)
S1:=(e rightrotate 6) xor
(e rightrotate 11) xor
(e rightrotate 25)

Additions and Boolean functions are computed slice-by-slice (instead of word-by-word for round [i]) as follows:
w[i]:=w[i−16]+s0+w[i−7]+s1
ch:=(e and f) xor ((not e) and g)
temp1:=h+S1+ch+k[i]+w[i]
maj:=(a and b) xor (a and c) xor (b and c)
temp2:=S0+maj
h:=g
g:=f
f:=e
e:=d+temp1
d:=c
c:=b
b:=a
a:=temp1+temp2
slice[j]=w[i−16] [j], w[i−15] [j], . . . , w[i−1] [j], a[j], b[j], . . . , h[j]

Hence, the slice [j] comprises twenty-four (24) bits.

Slice-by-slice computation of the SHA-2 functions for round [i] and slice[j] use bits [j] of each word w[i−16], . . . , w[i−1] of the input message and the chaining values a to h.

For SHA-512 with 64-bit words, 64 slices with j=0, 1, . . . , 63 are computed;
For SHA-256 with 32-bit words, 32 slices with j=0, 1, . . . , 31 are computed.
w[i] [j]:=w[i−16] [j]+s0[j]+w[i−7] [j]+s1[j]
ch:=(e[j] and f[j]) xor ((not e[j]) and g[j])
temp1:=h[j]+S1[j]+ch+k[i][j]+w[i][j]
maj:=(a[j] and b[j]) xor (a[j] and c[j]) xor (b[j] and c[j])
temp2:=S0[j]+maj
h[j]:=g[j]
g[j]:=f[j]
f=[j]:=e[j]
e[j]:=d+temp1
d[j]:=c[j]
c[j]:=b[j]
b[j]:=a[j]
a[j]:=temp1+temp2

Each bit-wise addition may be conducted using a standard full adder. However, other types of bit-wise adders may be used accordingly.
(c[j+1], s[j])=x[j]+y[j]+c[j]
with c[0]=0 and j=0, 1, . . . 63 (in case of SHA-512) or j=0, 1, . . . 31 (in case of SHA-256) the carry bits of all ten (10) adders may be stored temporarily and can be used by the operation directed to the next slice.

Figure 2:
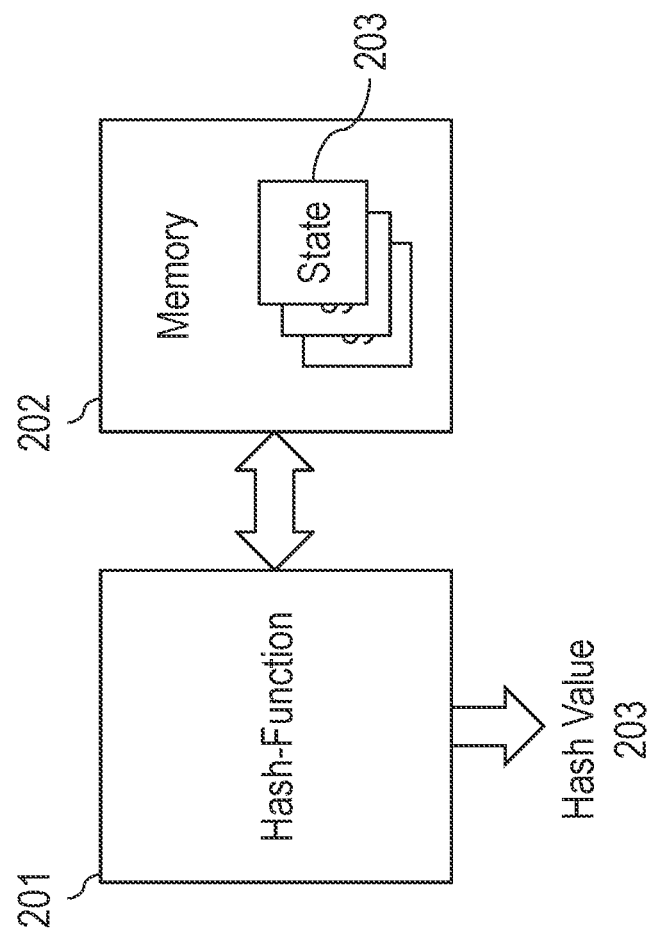
FIG. 2 shows a block diagram comprising a processing unit capable of computing hash values based on different types of hash functions as well as shared memory comprising at least one state.

FIG. 2 shows a block diagram comprising a processing unit 201 capable of computing hash values 203 based on different types of hash functions. The processing unit 201 has access to a shared memory 202, which comprises several states 203. Each state is a virtual data structure as shown in FIG. 1. The data structure is virtual, because the actual implementation of the virtual cube structure can be achieved in many ways via. e.g., file management systems.

Figure 3:
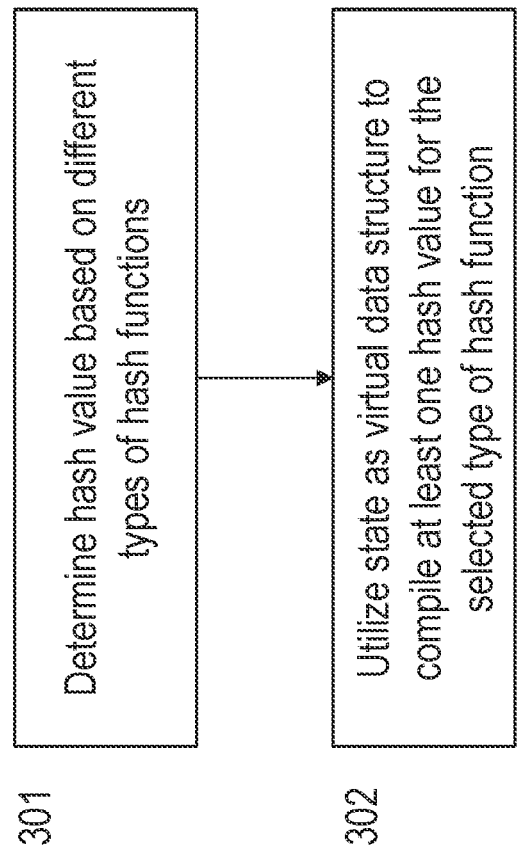
FIG. 3 shows a schematic flow chart comprising steps of a method to compile hash values for different types of hash functions by utilizing the common virtual data structure "state."

FIG. 3 shows a schematic flow chart comprising steps of a method to compile hash values for different types of hash functions by utilizing the common virtual data structure "state." In a step 301, a hash value is to be determined for one of various types of hash functions. The types of hash functions comprise SHA-1, SHA-2, and SHA-3. In a step 302, a shared memory is used to utilize a state 100 (see FIG. 1) as the virtual data structure to compile the hash value based on the respective type of hash function.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM.

EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor." as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A device for determining hash values based on at least two types of hash functions, the device comprising:
    a memory that is arranged to store at least one state to be used to determine hash values pursuant to a SHA-3 function, and
    processing circuitry arranged to determine hash values pursuant to any of a SHA-2 function or a SHA-1 function based on the state,
    wherein each of the states comprises bits that are arranged in a virtual data cube, wherein the virtual data cube comprises:
        a number of z slices,
        a number of y planes, and
        a number of x sheets.

2. The device of claim 1, wherein an input message of the SHA-2 function and chaining values of the SHA-2 function are stored in lanes of the state.

3. The device of claim 1, wherein the processing circuitry is configured to compute an addition of the SHA-2 function in a slice-by-slice manner on the slices of the state.

4. The device of claim 1, wherein the processing circuitry is configured to compute each of bitwise Boolean functions majority and choice of the SHA-2 function in a slice-by-slice manner on the slices of the state.

5. The device of claim 1, wherein the processing circuitry is configured to compute sigma functions of SHA-2 function in a lane-by-lane manner on lanes of the state.

6. The device of claim 1, wherein the state is part of a shared hardware, which further comprises a shared interface, shared data paths and/or a shared logic to determine the hash values.

7. The device of claim 1, wherein the device is at least one of the following or is at least part of one of the following or comprises at least one of the following: an integrated circuit,
    a hardware security module,
    a trusted platform module,
    a crypto unit,
    a FPGA,
    a processing unit,
    a controller,
    a smartcard.

8. A method for determining hash values by a processing circuitry based on at least two types of hash functions, the method comprising:
    using a shared memory comprising at least one state, wherein the structure of the state is capable for use in determining hash values pursuant to the SHA-3 function, and
    determining hash values pursuant to any of a SHA-2 function or a SHA-1 function based on the structure of the state,
    wherein each of the states comprises bits that are arranged in a virtual data cube, wherein the virtual data cube comprises:
        a number of z slices,
        a number of y planes, and
    a number of x sheets.

9. A computer program product directly loadable into a memory of a digital processing device, comprising software code portions for causing the digital processing device to:
    use a shared memory comprising at least one state, wherein the structure of the state is capable for use in determining hash values pursuant to the SHA-3 function, and determine hash values pursuant to any of a SHA-2 function or a SHA-1 function based on the structure of the state,
wherein each of the states comprises bits that are arranged in a virtual data cube, wherein the virtual data cube comprises:
  a number of z slices,
  a number of y planes, and
a number of x sheets.

* * * * *